US010921418B2

(12) United States Patent
Hwang (10) Patent No.: US 10,921,418 B2
(45) Date of Patent: Feb. 16, 2021

(54) METHOD AND APPARATUS FOR LOCATION ESTIMATION OF TERMINAL IN WIRELESS COMMUNICATION SYSTEM

(71) Applicant: Industry-Academic Cooperation Foundation, Chosun University, Gwangju (KR)

(72) Inventor: Suk Seung Hwang, Gwangju (KR)

(73) Assignee: Industry-Academic Cooperation Foundation, Chosun University, Dong-gu (KR)

( * ) Notice: Subject to any disclaimer, the term of this patent is extended or adjusted under 35 U.S.C. 154(b) by 0 days.

(21) Appl. No.: 16/665,312

(22) Filed: Oct. 28, 2019

(65) Prior Publication Data

US 2020/0209345 A1 Jul. 2, 2020

(30) Foreign Application Priority Data

Dec. 26, 2018 (KR) ........................ 10-2018-0169186

(51) Int. Cl.
*G01S 5/14* (2006.01)
*G01S 13/87* (2006.01)
*G01S 5/00* (2006.01)

(52) U.S. Cl.
CPC .................. *G01S 5/14* (2013.01); *G01S 5/00* (2013.01); *G01S 13/878* (2013.01)

(58) Field of Classification Search
CPC ..... G01S 5/14; G01S 5/02; G01S 5/10; G01S 13/878; G01S 5/0027; G01S 5/0036; G01S 5/00
See application file for complete search history.

(56) References Cited

U.S. PATENT DOCUMENTS

| 2001/0035841 | A1* | 11/2001 | Porcino | G01S 5/14 342/387 |
| 2003/0186707 | A1* | 10/2003 | Pihl | H04W 4/185 455/456.1 |
| 2008/0009295 | A1* | 1/2008 | Brousseau | H04W 64/00 455/456.1 |
| 2015/0148059 | A1* | 5/2015 | Puthenpura | H04W 64/00 455/456.1 |
| 2019/0274008 | A1* | 9/2019 | Grabbe | G01S 5/0284 |

FOREIGN PATENT DOCUMENTS

KR 20180047490 A * 5/2018

* cited by examiner

*Primary Examiner* — Magdi Elhag
(74) *Attorney, Agent, or Firm* — Studebaker & Brackett PC (57) ABSTRACT

Provided are a method and apparatus for location estimation of terminals in a wireless communication system. A method of operating a positioning apparatus may include (a) calculating distances between a terminal and first, second, and third base stations, (b) creating first, second, and third circles centered at locations of the first, second, and third base stations with radii corresponding to the distances, (c) calculating intersection distances between two intersections formed by the second circle, which is the smallest circle, and one of the first circle and the third circle and the other two intersections formed by the first circle and the third circle, and (d) determining one of the intersections corresponding to the shortest distance among the intersection distances as the terminal's location.

6 Claims, 6 Drawing Sheets

General Case

FIG. 3

Specific Case

METHOD AND APPARATUS FOR LOCATION ESTIMATION OF TERMINAL IN WIRELESS COMMUNICATION SYSTEM

CROSS-REFERENCE TO RELATED APPLICATION

This application claims priority to and the benefit of Korean Patent Application No. 10-2018-0169186, filed on Dec. 26, 2018, the disclosure of which is incorporated herein by reference in its entirety.

BACKGROUND

1. Field of the Invention

The present invention relates to a wireless communication system, and more particularly, to a method and apparatus for location estimation of terminals in a wireless communication system.

2. Discussion of Related Art

A technique for location estimation of a specific user or object is being used in various communication systems, such as a location-based service (LBS), and has been spotlighted as an important issue of wireless communication technology. Since the Federal Communications Commission (FCC) of the United States mandated that mobile terminals must be equipped with a terminal location estimation function for enhanced 911 (Enhanced-911), a technique for location estimation of terminals in a wireless communication system has received more attention. Various terminal location estimation techniques have been developed and may be largely classified into two types, that is, a handset type using the Global Positioning System (GPS) and a network type using base stations.

The time-of-arrival (TOA) triangulation method is a representative example of the network-type location estimation technique and is a method of estimating distances between a terminal and three base stations by creating three circles centered at the coordinates of the three base stations with radii equal to the three estimated distances and determining that the intersection of the three circles is the location of the terminal.

Generally, a distance is estimated using the number of times signals transmitted or received between a base station and a terminal are delayed. Due to this process, the estimated distance is longer than the actual distance. Accordingly, three circles do not meet at one point, and thus a location estimation error occurs. To solve this problem, a least square (LS) scheme, a scheme of finding the average of three internal intersections out of six intersections formed by three circles, i.e., a shortest distance algorithm, and the like have been proposed, each of which has its drawbacks.

The LS scheme causes a relatively large location estimation error, and the shortest distance algorithm exhibits good performance in normal situations but also causes a considerably large location estimation error in particular situations.

SUMMARY

The present invention is designed to solve the above problems and is directed to a method and apparatus for location estimation of terminals in a wireless communication system.

The present invention is directed to determining, when a small circle is located in a region formed by the other two circles and meets one of the two circles at two intersections, an intersection of a small circle corresponding to the shortest distance among distances between the two intersections and the other two intersections formed by the other two circles as a terminal's location.

The present invention is not limited to the above objects, and other objects not described herein can be clearly understood from the following description.

According to an aspect of the present invention, there is provided a method of operating a positioning apparatus, the method including (a) calculating distances between a terminal and first, second, and third base stations; (b) creating first, second, and third circles centered at locations of the first, second, and third base stations with radii corresponding to the distances; (c) calculating intersection distances between two intersections formed by the second circle, which is the smallest circle, and one of the first circle and the third circle and the other two intersections formed by the first circle and the third circle; and (d) determining one of the intersections corresponding to the shortest distance among the intersection distances as a location of the terminal.

In an embodiment, operation (a) may include calculating the distances on the basis of a time of arrival (TOA) of signals transmitted from the first, second, and third base stations to the terminal.

In an embodiment, the second circle does not intersect the other one of the first circle and the third circle.

In an embodiment, the method may further include, between operations (b) and (c), identifying the two intersections formed by the second circle and the one of the first circle and the third circle when the second circle, which is the smallest circle among the first, second, and third circles, is located in a region formed by the first circle and the third circle.

According to another aspect of the present invention, there is provided a positioning apparatus including a control unit configured to calculate distances between a terminal and first, second, and third base stations, create first, second, and third circles centered at locations of the first, second, and third base stations with radii corresponding to the distances, calculate intersection distances between two intersections formed by the second circle, which is the smallest circle, and one of the first circle and the third circle and the other two intersections formed by the first circle and the third circle; and determine one of the intersections corresponding to the shortest distance among the intersection distances as a location of the terminal.

In an embodiment, the control unit may calculate the distances on the basis of a time of arrival (TOA) of signals transmitted from the first, second, and third base stations to the terminal.

In an embodiment, the second circle does not intersect the other one of the first circle and the third circle.

In an embodiment, the control unit may identify the two intersections formed by the second circle and the one of the first circle and the third circle when the second circle, which is the smallest circle among the first, second, and third circles, is located in a region formed by the first circle and the third circle.

Specific details for achieving the above objects will become apparent with reference to embodiments to be described later in detail with the accompanying drawings.

The present invention may, however, be embodied in different forms and should not be construed as limited to the embodiments set forth herein. Rather, these embodiments are provided so that this disclosure will be thorough and complete and will fully convey the scope of the present invention to those skilled in the art.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

The present invention may be modified in various ways and may have various embodiments. Therefore, specific embodiments illustrated in the drawings will be described in detail.

Various features of the present invention set forth in the claims will be better understood by considering the drawings and the detailed description. The apparatus, method, preparation, and various embodiments disclosed herein are provided for illustration. The disclosed structural and functional features are intended to enable those skilled in the art to specifically practice the various embodiments and are not intended to limit the scope of the invention. The terms and sentences disclosed herein are intended to explain various features of the present invention in an easy-to-understand manner and are not intended to limit the scope of the invention.

In the following description of the present invention, if it is determined that the detailed description of the related known technology may unnecessarily obscure the subject matter of the present invention, the detailed description thereof will be omitted.

A method and apparatus for location estimation of terminals based on a small-circle intersection method according to an embodiment of the present invention will be described below.

The method and apparatus for location estimation of terminals based on a small-circle intersection method may be utilized not only for wireless communication systems but also for mobile robot systems and various military instruments that require high precision.

Figure 1:
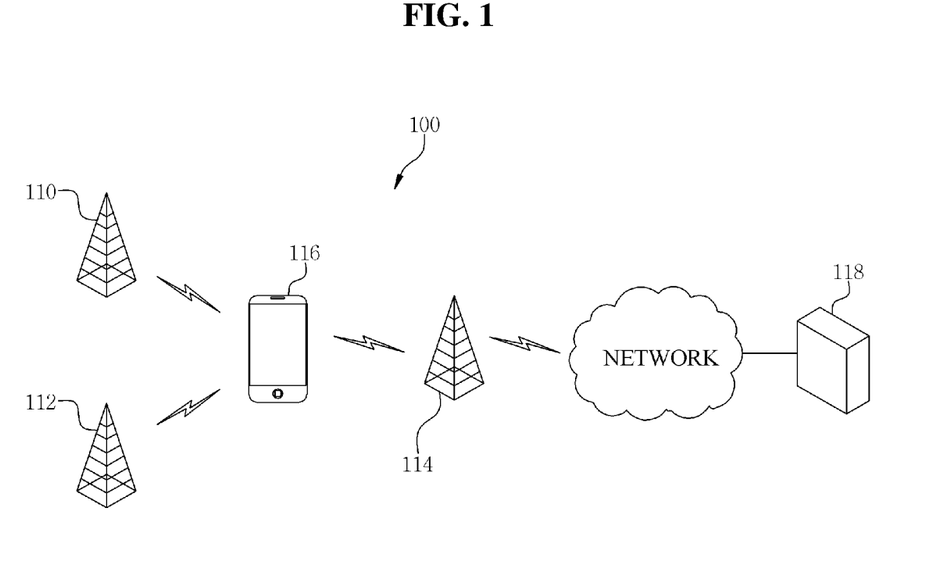
FIG. 1 shows a wireless communication system according to an embodiment of the present invention.

FIG. 1 shows a wireless communication system 100 according to an embodiment of the present invention.

Referring to FIG. 1, the wireless communication system 100 may include first, second, and third base stations 110, 112, and 114, a terminal 116, and a positioning apparatus 118.

The first, second, and third base stations 110, 112, and 114 may be distributed to predetermined regions in a corresponding network and may communicate with the terminal 116 over a wireless channel according to the communication policy of the network.

The positioning apparatus 118 may acquire the current location of the terminal 116 on the basis of the predetermined regions of the corresponding network to which the first, second, and third base stations 110, 112, and 114 are distributed by performing time-of-arrival-based distance measurement.

In an embodiment, the positioning apparatus 118 may be of a fixed type or a location-acquirable moving type. The positioning apparatus 118 may activate a wireless channel, temporarily or continuously measure the location of the terminal 116, and output the measured location at predetermined intervals. In an embodiment, the positioning apparatus 118 may be installed in the terminal 116 or a location measurement service server for providing a location-based service in the network.

Figure 2:
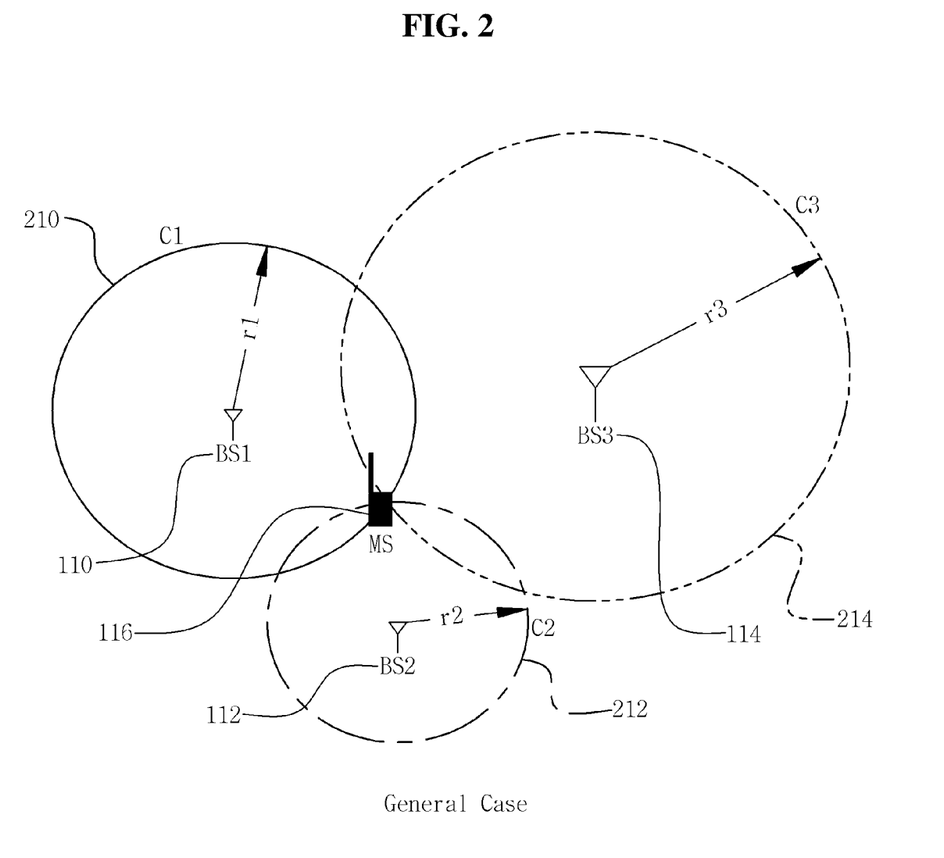
FIG. 2 shows an example of a conventional terminal positioning method using a time-of-arrival (TOA) triangulation method.

FIG. 2 shows an example of a conventional terminal positioning method using a time-of-arrival (TOA) triangulation method.

Referring to FIG. 2, an example of a positional relation between the terminal 116 and the first, second, and third base stations 110, 112, and 114 is shown.

Generally, a distance measurement scheme in the TOA triangulation method is a scheme of recognizing the location of a target object using a measured distance to the target object on the basis of location information regarding three points and is mainly used to calculate the location of a mobile terminal after distances from three or more reference points are measured using a time of flight (ToF), attenuation, and the like of signals or electronic waves (e.g., satellite signals, mobile communication signals, ultrasonic waves, radio frequency (RF) signals, or the like).

The location of the terminal 116 may be measured on the basis of distance information between the terminals 116 and the first, second, and third base stations 110, 112, and 114, which is transmitted through the network. In detail, the location of the terminal 116 is estimated using intersections of first, second, and third circles 210, 212, and 214 based on the distances r1, r2, and r3 between the terminal 116 and the first, second, and third base stations 110, 112, and 114 and the coordinates of the first, second, and third base stations 110, 112, and 114.

Figure 3:
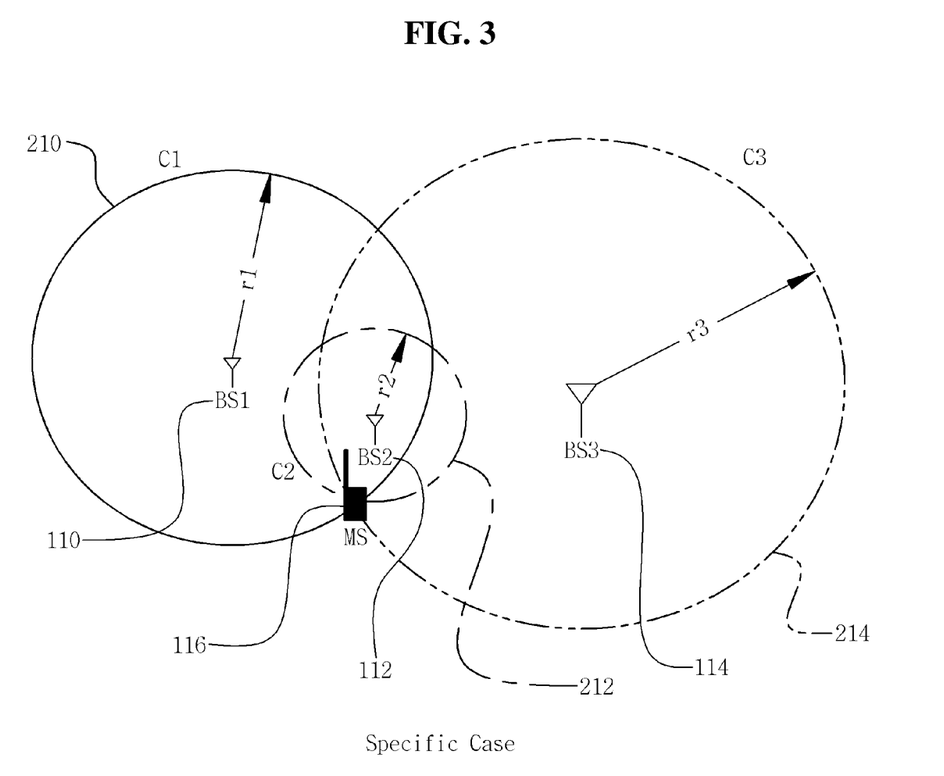
FIG. 3 shows an example of a terminal positioning method corresponding to when one small circle intersects both of two large circles in a conventional case.

FIG. 3 shows an example of a terminal positioning method corresponding to when one small circle intersects both of two large circles in a conventional case.

Referring to FIG. 3, the location of the terminal 116 relative to the first, second, and third base stations 110, 112, and 114 may have a specific location unlike a general location of FIG. 2. That is, when one small circle is included in a region of two large circles, an error may occur with the conventional triangulation method. Therefore, an intersection distance comparison method specialized for such a special case has been proposed, but it does not work properly when the small circle meets only one of the two large circles.

On the other hand, the terminal positioning method according to an embodiment of the present invention may accurately calculate the location of the terminal when the small circle meets one of the two large circles, that is, when the small circle does not intersect the other one of the two large circles.

Figure 4:
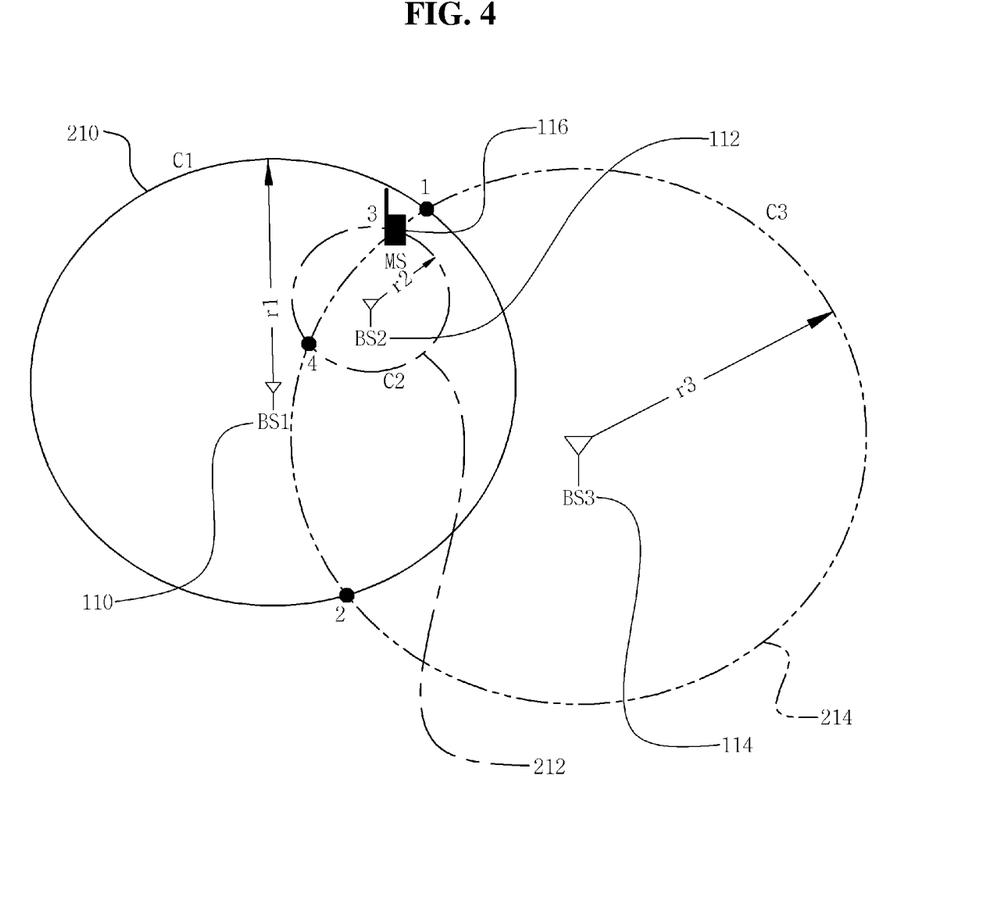
FIG. 4 shows an example of a terminal positioning method corresponding to when one small circle intersects one of two large circles according to an embodiment of the present invention.

FIG. 4 shows an example of a method of positioning the terminal 116 when one small circle intersects one of two large circles according to an embodiment of the present invention.

Referring to FIG. 4, the special case considered in the present invention indicates a case where the first, second, and third circles 210, 212, and 214 corresponding to the first, second, and third base stations 110, 112, and 114 have four intersections 1, 2, 3, and 4 and also the second circle 212 (i.e., the smallest circle) meets the third circle 214 (i.e., one of the other two circles) at two intersections 3 and 4 while the second circle 212, which is the smallest circle, is located in a region formed by the first circle 210 and the third circle 214.

In this case, the positioning apparatus 118 may calculate a total of four distances between the two intersections 3 and 4 formed by the first circle 210 and the third circle 214 and the two intersections 1 and 2 formed by the second circle 212 and the third circle 214. In an embodiment, the distances may be represented using the following equation:

$$d_{lk} = \sqrt{(x_l - \alpha_k)^2 + (y_l - \beta_k)^2}, \text{ for } l = 1, 2, \text{ and } k = 1, 2, \quad \text{[Equation 1]}$$

where $(x_l, y_l)$ indicates the coordinates of the intersections between the second circle 212, which is the smallest circle, and the other two circles 210 and 214, and $(\alpha_k, \beta_k)$ indicates the coordinates of the intersections between the other two circles, that is, the first circle 210 and the third circle 214.

Subsequently, the positioning apparatus 118 may compare the calculated four distances, select the shortest distance, and determine the intersection of the second circle 212 (i.e., intersection 3) corresponding to the shortest distance.

As described above, the method of positioning the terminal 116 according to an embodiment of the present invention can reduce serious errors when the location is estimated by the TOA triangulation method.

Figure 5:
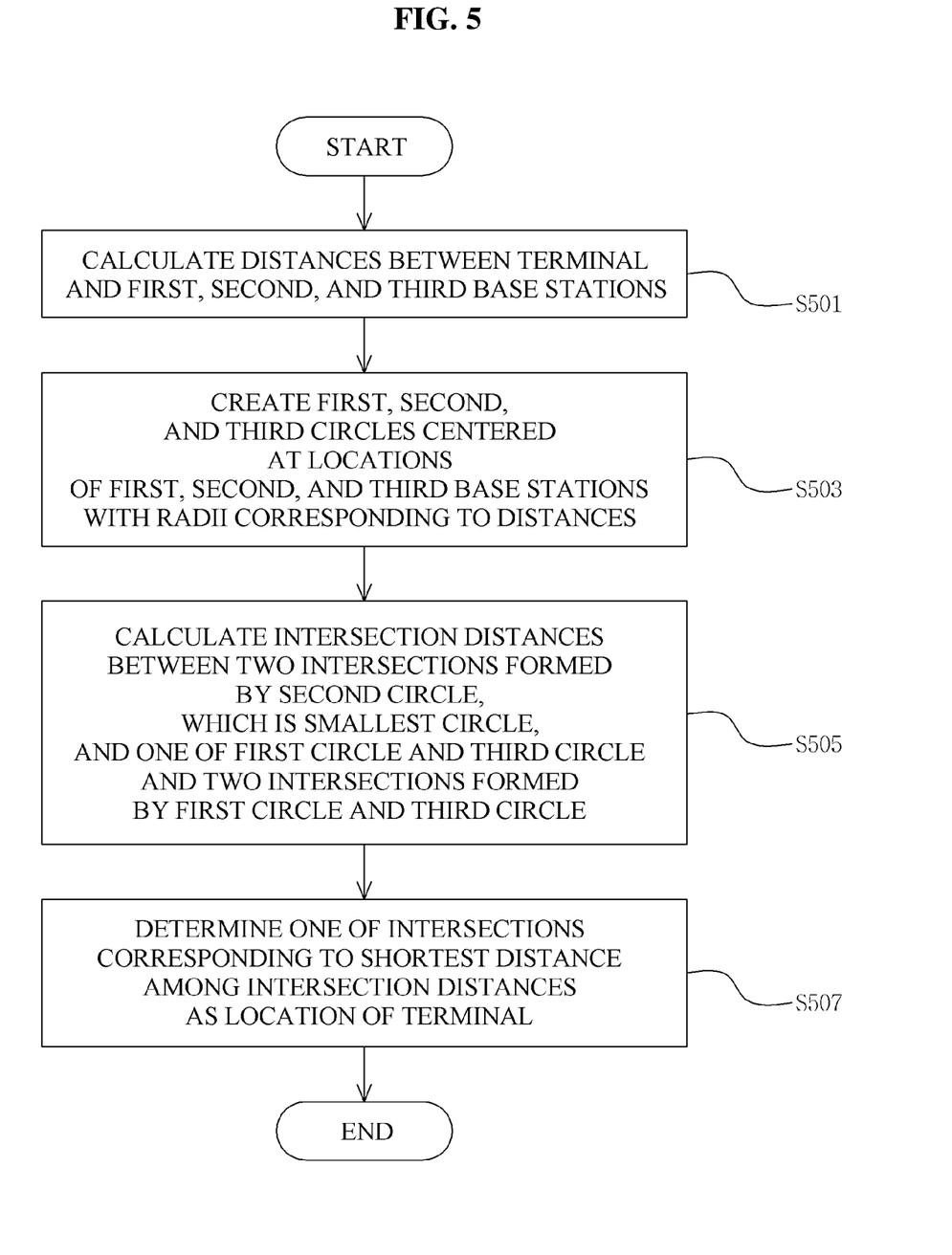
FIG. 5 shows a method of operating a positioning apparatus according to an embodiment of the present invention.

FIG. 5 shows a method of operating the positioning apparatus 118 according to an embodiment of the present invention.

Referring to FIG. 5, operation S501 is an operation of calculating distances between the terminal 116 and the first, second, and third base stations 110, 112, and 114. In an embodiment, the distances may be calculated on the basis of the TOA of signals transmitted from the first, second, and third base stations 110, 112, and 114 to the terminal 116.

Operation S503 is an operation of creating the first, second, and third circles 210, 212, and 214 centered at the locations of the first, second, and third base stations 110, 112, and 114 with radii corresponding to the distances.

In an embodiment, while the second circle 212, which is the smallest circle among the first, second, and third circles 210, 212, and 214, is located in a region formed by the first circle 210 and the third circle 214, two intersections 3 and 4 formed by the second circle 212 and one of the first circle 210 and the third circle 214 may be identified.

Operation S505 is an operation of calculating intersection distances between the two intersections 3 and 4 formed by the second circle 212, which is the smallest circle, and one of the first circle 210 and the third circle 214 and between the other two intersections 1 and 2 formed by the first circle 210 and the third circle 214. In an embodiment, the second circle 212 may not intersect the other one of the first circle 210 and the third circle 214.

Operation S507 is an operation of determining one of the intersections 3 and 4 corresponding to the shortest distance among the intersection distances (i.e., the intersection 3) as the location of the terminal 116.

Figure 6:
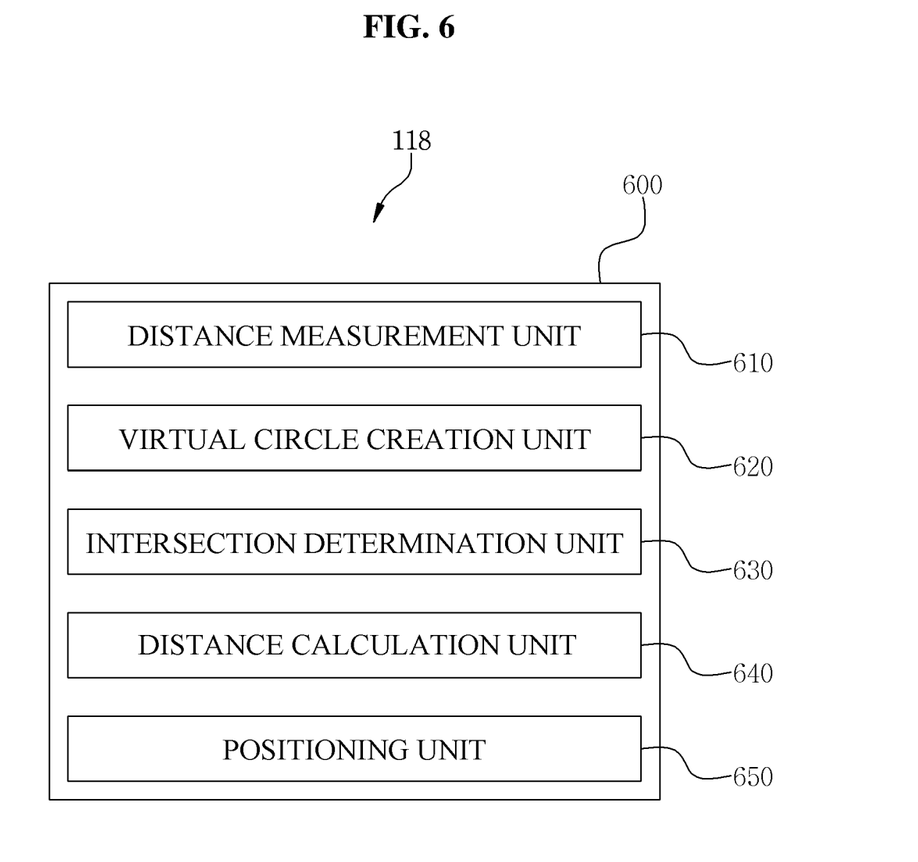
FIG. 6 shows a functional configuration of a positioning apparatus according to an embodiment of the present invention.

FIG. 6 shows a functional configuration of the positioning apparatus 118 according to an embodiment of the present invention.

Referring to FIG. 6, the positioning apparatus 118 may include a control unit 600. The control unit 600 may include a distance measurement unit 610, a virtual circle creation unit 620, an intersection determination unit 630, a distance calculation unit 640, and a positioning unit 650.

The distance measurement unit 610 may estimate distances between the terminal 116 and the first, second, and third base stations 110, 112, and 114 distributed to predetermined locations in the network on the basis of the TOA of signals transmitted from the first, second, and third base stations 110, 112, and 114 to the serving terminal 116.

In an embodiment, the positioning apparatus 118 may include a communication unit (not shown) configured to receive distance information between the terminal 116 and the first, second, and third base stations 110, 112, and 114.

The virtual circle creation unit 620 may create the first, second, and third circles 210, 212, and 214 centered at the locations of the first, second, and third base stations 110, 112, and 114 with radii corresponding to the distances.

The intersection determination unit 630 may identify two intersections 3 and 4 formed by the second circle 212 and one of the first circle 210 and the third circle 214 while the second circle 212, which is the smallest circle among the first, second, and third circles 210, 212, and 214, is located in a region formed by the first circle 210 and the third circle 214. In an embodiment, the intersection determination unit 630 may determine two intersections 1 and 2 formed by the first circle 210 and the third circle 214.

The distance calculation unit 640 may calculate intersection distances between the two intersections 3 and 4 and the other two intersections 1 and 2 formed by the first circle 210 and the third circle 214.

The positioning unit 650 may determine one of the intersections 3 and 4 corresponding to the shortest distance among the intersection distances (i.e., the intersection 3) as the location of the terminal 116.

In an embodiment, the control unit 600 may include at least one processor or microprocessor or may be a portion of the processor. Also, the control unit 600 may be referred to as a communication processor (CP). In an embodiment, the control unit 600 may execute computation or data processing associated with the control of at least another element of the positioning apparatus 118.

According to an embodiment of the present invention, by determining, as a terminal's location, an intersection of a small circle corresponding to the shortest distance among distances between two intersections formed by the small circle and one of the other two circles and the other two intersections formed by the two circles, it is possible to accurately estimate the terminal's location even when the small circle is located in a region formed by the other two circles and meets the one of the other two circles at the two intersections.

The present invention is not limited to the above advantageous effects, and tentative effects expected from the technical features of the present invention can be clearly understood from the following description.

The above description is merely illustrative of the technical spirit of the present invention, and it will be apparent to those skilled in the art that various modifications and variations can be made therein without departing from the essential characteristics of the invention.

Accordingly, the embodiments disclosed herein are intended not to limit but to describe the technical spirit of the present invention, and the scope of the present invention is not limited by the embodiments.

The scope of the present invention should be interpreted by the appended claims, and all the technical spirits in the equivalent range should be understood as being embraced by the claims of the present invention.

What is claimed is:

1. A method of operating a positioning apparatus including a processor, the method comprising:
   (a) calculating distances between a terminal and first, second, and third base stations;
   (b) creating first, second, and third circles centered at locations of the first, second, and third base stations with radii corresponding to the distances;
   (c) calculating intersection distances between two intersections formed by the second circle, which is the smallest circle, and one of the first circle and the third circle and the other two intersections formed by the first circle and the third circle; and
   (d) determining one of the intersections corresponding to the shortest distance among the intersection distances as the terminal's location,
   wherein operation (a) comprises calculating the distances on the basis of a time of arrival (TOA) of signals transmitted from the first, second, and third base stations to the terminal.

2. The method of claim 1, wherein the second circle does not intersect the other one of the first circle and the third circle.

3. The method of claim 1, further comprising, between operations (b) and (c), identifying the two intersections formed by the second circle and the one of the first circle and the third circle when the second circle, which is the smallest circle among the first, second, and third circles, is located in a region formed by the first circle and the third circle.

4. A positioning apparatus comprising a processor configured to calculate distances between a terminal and first, second, and third base stations; create first, second, and third circles centered at locations of the first, second, and third base stations with radii corresponding to the distances; calculate intersection distances between two intersections formed by the second circle, which is the smallest circle, and one of the first circle and the third circle and the other two intersections formed by the first circle and the third circle; and determine one of the intersections corresponding to the shortest distance among the intersection distances as the terminal's location, wherein the processor calculates the distances on the basis of a time of arrival (TOA) of signals transmitted from the first, second, and third base stations to the terminal.

5. The positioning apparatus of claim 4, wherein the second circle does not intersect the other one of the first circle and the third circle.

6. The positioning apparatus of claim 5, wherein the processor identifies the two intersections formed by the second circle and the one of the first circle and the third circle when the second circle, which is the smallest circle among the first, second, and third circles, is located in a region formed by the first circle and the third circle.

* * * * *